United States Patent
Shannon et al.

(10) Patent No.: US 7,111,812 B2
(45) Date of Patent: Sep. 26, 2006

(54) FASTENING DEVICE

(76) Inventors: Eugene E. Shannon, 12 Mallard La., Londonderry, NH (US) 03053; Paul Shannon, 12 Mallard La., Londonderry, NH (US) 03053

( * ) Notice: Subject to any disclaimer, the term of this patent is extended or adjusted under 35 U.S.C. 154(b) by 0 days.

(21) Appl. No.: 10/978,885

(22) Filed: Nov. 1, 2004

(65) Prior Publication Data

US 2006/0091270 A1   May 4, 2006

(51) Int. Cl.
 *G09F 7/18* (2006.01)
(52) U.S. Cl. .............................. 248/230.7; 248/227.3; 248/309.1
(58) Field of Classification Search ............. 248/218.4, 248/214, 219.4, 219.3, 229.16, 229.26, 223.41, 248/227.3, 230.7, 231.81, 316.8, 309.1
See application file for complete search history.

(56) References Cited

U.S. PATENT DOCUMENTS

| 1,954,269 A | * | 4/1934 | Slowig ........................ 224/483 |
| 2,995,333 A | * | 8/1961 | Pazzano ................... 248/230.7 |
| 3,370,820 A | * | 2/1968 | Liss et al. ................. 248/312.1 |
| 3,696,233 A | * | 10/1972 | Pulsifer ....................... 219/535 |
| D228,738 S | * | 10/1973 | Albrizzi ........................ D8/394 |
| 3,807,675 A | * | 4/1974 | Seckerson et al. ............. 248/73 |
| 3,881,677 A | * | 5/1975 | Ihlenfeld .................. 248/311.2 |
| 4,320,832 A | * | 3/1982 | Edstrom ...................... 206/228 |
| 4,821,988 A | * | 4/1989 | Jimenez .................... 248/227.3 |
| 4,878,642 A | * | 11/1989 | Kirby, Jr. ................. 248/311.2 |
| 5,188,327 A | * | 2/1993 | White ................... 248/231.81 |
| 5,356,107 A | * | 10/1994 | Sinohuiz .................. 248/311.2 |
| 5,358,205 A | * | 10/1994 | Starkey et al. ......... 248/220.21 |
| 5,386,961 A | * | 2/1995 | Lu .......................... 248/223.41 |
| 6,409,131 B1 | * | 6/2002 | Bentley et al. .......... 248/219.4 |
| 6,557,808 B1 | * | 5/2003 | Ling ........................ 248/229.1 |
| 6,644,608 B1 | * | 11/2003 | Begg ..................... 248/229.16 |
| 2002/0096610 A1 | * | 7/2002 | Fernandez ............... 248/218.4 |

\* cited by examiner

*Primary Examiner*—Anita M. King
(74) *Attorney, Agent, or Firm*—Joseph E. Funk

(57) ABSTRACT

A fastening device is disclosed for attachment to a pole without the need for tools and without the need for excessive force to mount or remove the device from the pole. The device has an interior channel that is open along a side of the fastening device. The opening in the channel along the side of the device is defined by first edges that are uniformly spaced apart and contiguous second edges that are angled away from each other, starting with the spacing of the first edges, until their spacing is equal to the diameter of the pole. To mount the fastening device to the pole its top edge with the widest spacing of the second edges are placed against the pole and pushed on to the pole for a short distance before rotating the bottom of the fastening device on to the pole. This attachment sequence distributes the mounting force timewise making it easier to attach or remove the fastening device to or from the pole.

16 Claims, 4 Drawing Sheets

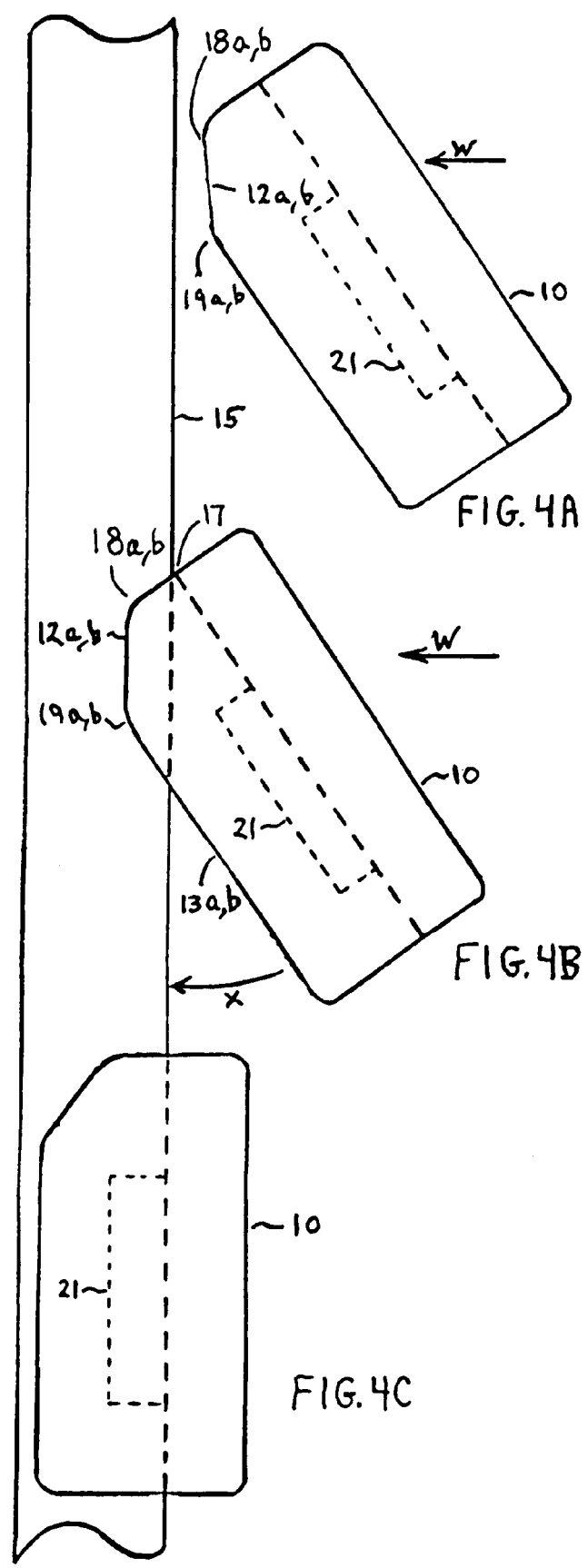

FASTENING DEVICE

FIELD OF THE INVENTION

This invention relates to a device for attaching and securing an implement or instrument, such as a cellular telephone to a pole.

BACKGROUND OF THE INVENTION

Cellular telephones and other small electronic devices such as portable radios are commonly used all over the world. There is a disadvantage that such cellular telephones and other electronic devices are small and too often become misplaced, sat on, or knocked onto the ground or into the water, especially when the telephone or other device is located on a patio, poolside or on a boat and is not carried in a holster or other carrier attached to a person' attire. This is too often the case when people are wearing bathing suits and are outdoors on a patio, poolside or on a boat. There is no way to attach a holster or carrier to a person dressed in such attire. The cellular telephones or other devices can only be placed on tables, chairs, lounges, shelves or other places where they can be sat on, covered, or knocked off where they have been placed.

Conventional holsters available for use in carrying such cellular telephones are designed for carrying the telephones on a person, such as on their belt. Other holders available for use with cellular telephones are typically attached to a dashboard of a vehicle, a sort of cradle, and the telephone is positioned in the cradle. Most of these cradles are part of a hands-free system for using the cellular telephones in vehicles. These existing holsters or cradles does not work in locations and situations such as described in the previous paragraph.

On a boat drinks in a glass, bottle, can or other container can, when available, be placed in shallow recesses or wells (cup or glass holders) molded into plastic pieces of the boat. However, too often, such a cup or glass holders are not available or not located in a position that is convenient for a user and they then place these items on various flat surfaces from which they are too easily knocked over, or slide when the boat is in motion. In addition, even when a glass, bottle or can is positioned in such a cup or glass holder, if the container is full and the boat pitches off vertical in a swell from another boat or due to rough water, the contents therein spills because the container does not remain in a vertical position.

Thus, there is a need in the art for apparatus that safely mounts and secures small devices, particularly small electronic devices such as cellular telephones, in a secure manner exactly where they are needed and prevents them from getting lost, from being sat on, knocked to the ground or into water, in environments such as on a patio, at a poolside or on a boat, while at the same time making the devices easily detachable for immediate use. There is also a need in the art for apparatus that can hold a variety of containers on a boat in a manner that these items will not fall or be lost overboard.

SUMMARY OF THE INVENTION

The need in the prior art for apparatus that safely mounts and secures small devices, particularly small electronic devices such as cellular telephones etc., in a manner that prevents them from getting lost, becoming dislodged, or knocked to the ground or into water, in environments such as on a patio, at a poolside or on a boat, while at the same time making the devices easily detachable for use is satisfied by the present invention. The need in the prior art for apparatus that can hold drink containers or other devices securely on a boat in a manner that they will not fall, spill or be lost is satisfied.

A base mount is provided that is easily and quickly mounted onto a pole, such as the pole of a sun umbrella on a patio or by a poolside, or to a piece of round tubing of various railings and guards found on a boat or recreational vehicles or in other applications, without the use of tools. The base mount has a first mounting means that is quickly, easily and pivotably mountable to a second mounting means that is attached to a small device such as small electronic devices including cellular telephones, or to a glass, bottle, or can holder. The second mounting means cannot inadvertently be detached from the first mounting means that is part of the base mount. Because the second mounting means is pivotably mounted to the first mounting means, if the second mounting is attached to a drink holder the drink will remain in a generally upright position even when the base mount with its first mounting means are in other than an upright position

DESCRIPTION OF THE DRAWINGS

The invention will be better understood upon reading the following detailed description in conjunction with the drawing in which:

FIGS. 4A–4C respectively show a left side view of the novel fastening device as it is being attached to a pole.

DETAILED DESCRIPTION

Figure 2:
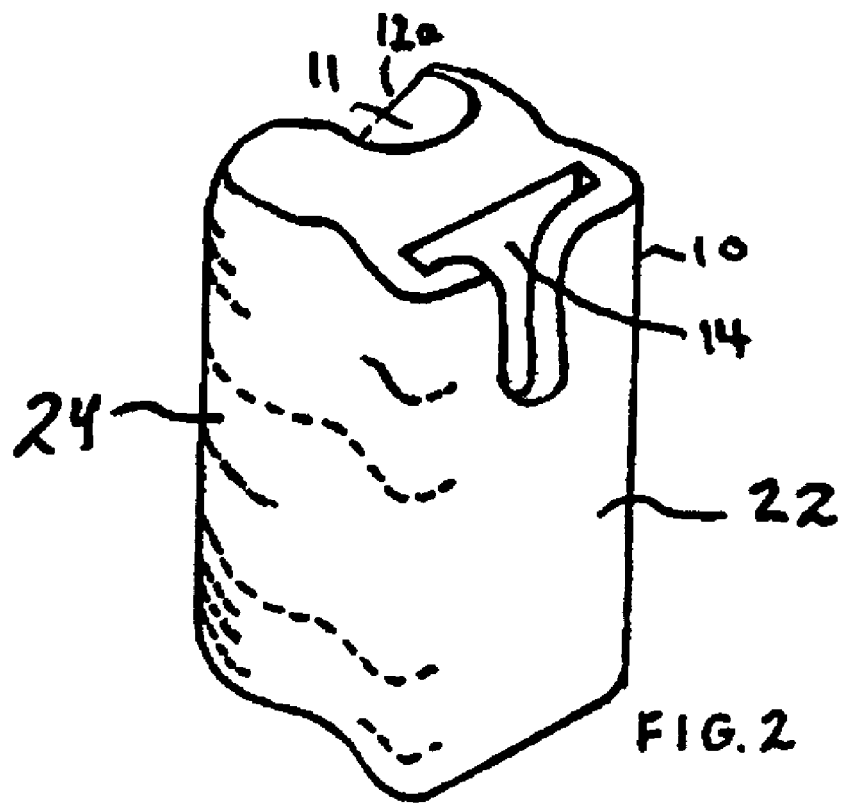
FIG. 2 shows a rear, orthogonal view of the novel fastening device.
Figure 1:
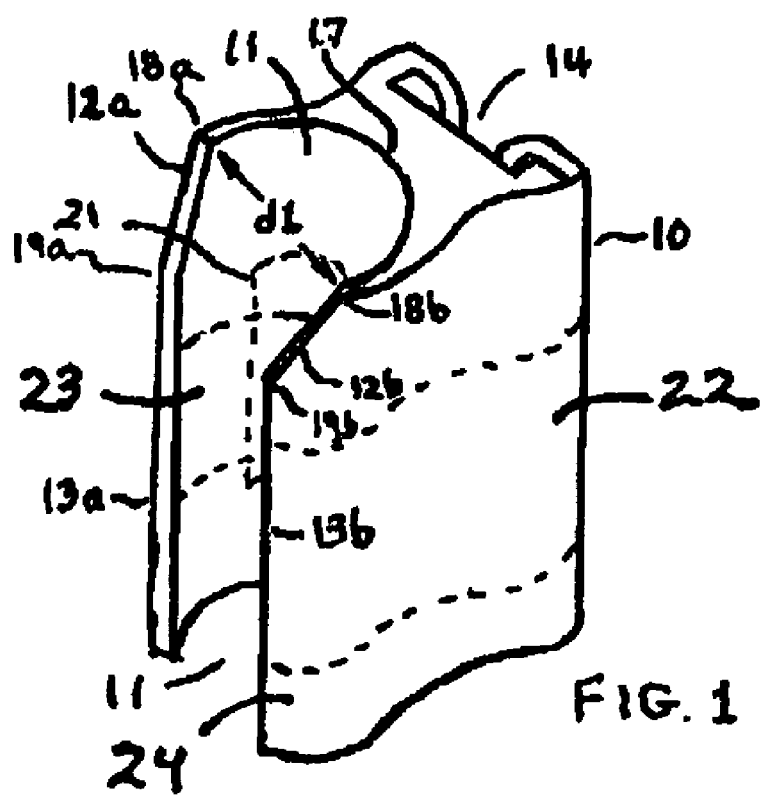
FIG. 1 shows a front, orthogonal view of the novel fastening device.
Figure 5A:
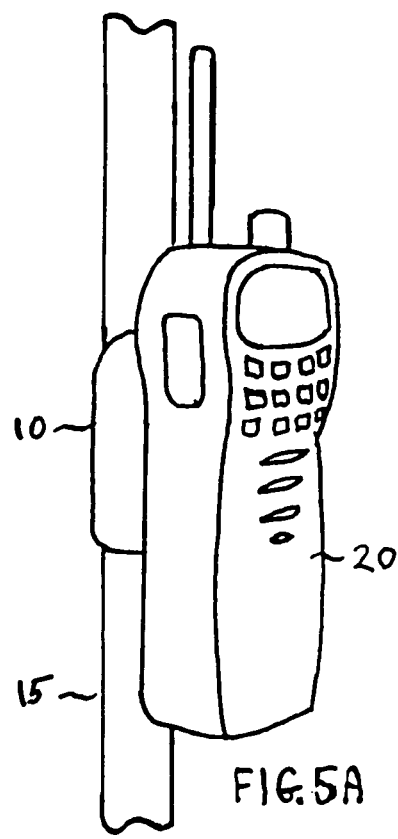
FIGS. 5A & 5B show the novel fastening device attached to a pole in two different orientations with an electronic device attached to the fastening device.
Figure 5B:
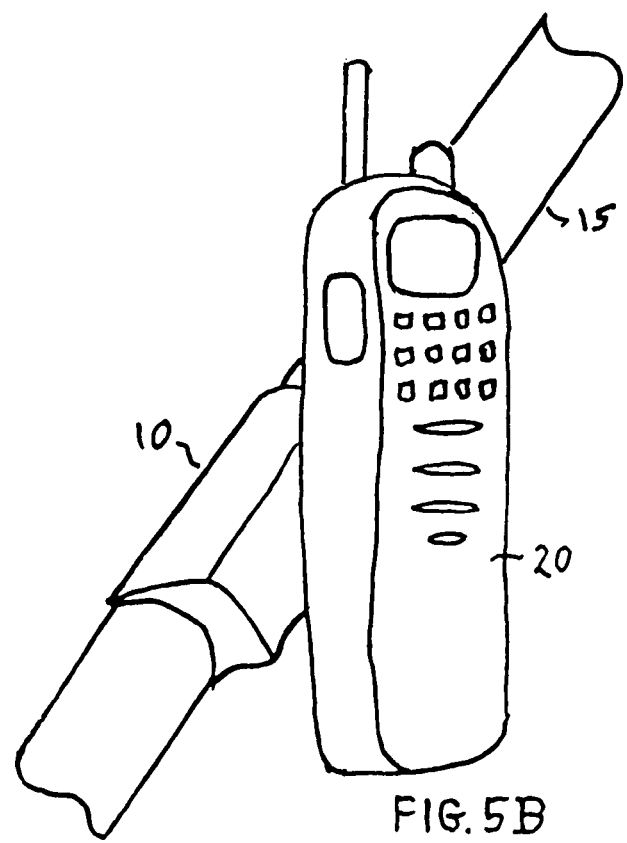

There are dashed lines shown on the outer surface of the fastening device 10 in FIGS. 1 and 2. These dashed lines form no specific part of the fastening device 10 and are only meant to show contours of the surface of device 10. Novel fastening device 10 is quickly and easily attached or removed from a pole 15 (FIGS. 5A and 5B) without the use of tools. Other items such as, but not limited to, cup holders and electronic devices are quickly and conveniently attached to and detached from fastening device 10 as shown in FIGS. 5A and 5B. In FIGS. 5A and 5B a hand-held radio 20 is shown attached to device 10 which in turn is attached to a pole 15. Pole 15 preferably has a circular cross-section.

FIG. 1 shows a front orthogonal view of novel fastening device 10. Device 10 is molded or otherwise fabricated from a plastic material, such as DELRIN plastic or nylon, which is strong, tough and will not easily break, yet has a sufficient amount of flexibility. Device 10 may be of any color that is aesthetically pleasing.

Figure 3A:
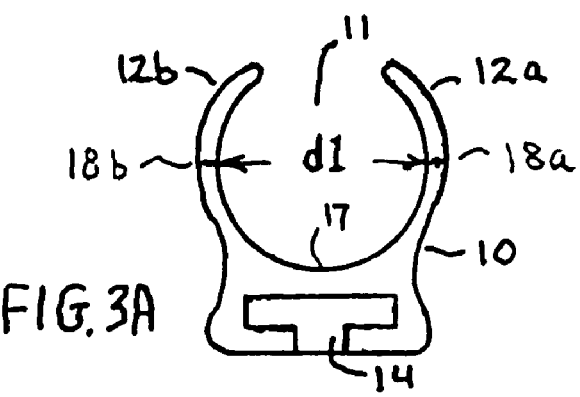
FIGS. 3A–3C respectively show isometric views of the top, left side and rear of the novel fastening device.

Device 10 has a main body 22 with a retaining notch 14 therein. Device 10 also has a first, elongated arcuate member 23 and a second, elongated arcuate member 24 that define an open, recessed, vertical channel 11 in its front side that has a circular cross section 11 that is also shown in FIG. 3A. The open front of channel 11 is partially defined by edges 13a and 13b that extend to the bottom of device 10. However, the upper portion of the edges are cut back as shown and define edges 12a and 12b. Edge 12a is lengthwise contiguous with edge 13a on member 23 and edge 12b is lengthwise contiguous with edge 13b on member 24. Cut back edges 12a and 12b are important to quickly and easily attach device 10 to pole 15 as shown and described with reference to FIGS. 4A through 4C.

When a piece of double sided tape 21 is placed inside vertical channel 11 in device 11 against its back wall as shown. When fastening device 10 is fully seated and the device snaps fully onto pole 15 tape 21 bonds fastening device 10 to pole 15 so it cannot move along the pole or rotate and cannot be removed from the pole. If it is desired to have device 10 move along pole 15, rotate or be removed at a later time without extreme difficulty, tape 21 should not be used.

The top 18a and 18b respectively of cut back edges 12a and 12b preferably intersect the top of device 10 at opposite sides of circular cross section channel 11 at its diameter d1 as shown in both FIGS. 1 and 3A. The bottom of cut back edges 12a and 12b are defined by points 19a than 19b. The wall thickness around vertical channel 11 may vary and be thinnest right at cut back edges 12a and 12b and edges 13a and 13b, while being thicker at the rear of vertical channel 11. It is important to note that points 18a and 18b are positioned further to the rear of vertical channel 11, closer to point 17, than points 19a and 19b. The result is that the distance between points 18a and 18b is greater than the distance between points 19a than 19b.

On the backside of fastening device 10 is a retaining notch 14 that is used to attach other items 20 such as, but not limited to, cup holders and electronic devices to device 10. The other items 20 each have a mating T-shaped element fastened thereto (not shown) the T-shaped top of which is slid into notch 14 to attach the items 20 to device 10, such a shown in FIGS. 5A and 5B. Retaining notch 14 is better seen in FIGS. 2 and 3C. Details of how retaining notch 14 cooperates with a mating T-shaped element fastened to an item 20 to attach the item to device 10 are not presented here because they are not part of the present invention.

Fastening device 10 is quickly and easily snapped onto a pole having a circular cross-section and a diameter of d1 as is the ascribed hereinafter with reference to FIGS. 4A through 4C.

Figure 3B:
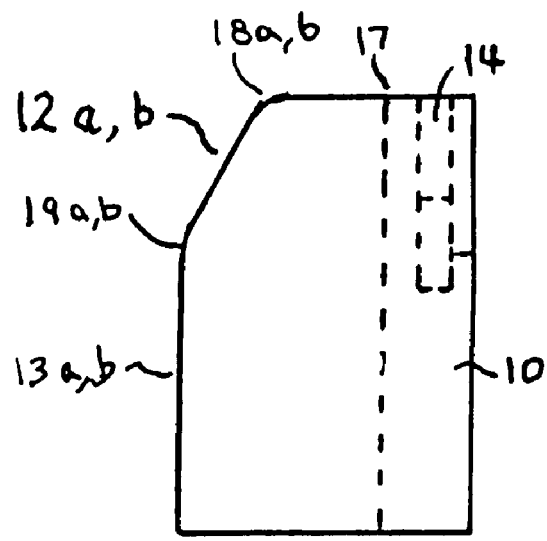
Figure 3C:
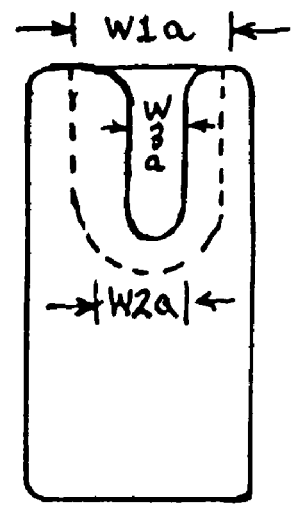

FIG. 2 shows a rear orthogonal view of fastening device 10. Channel 11 and cut back edge 12a are seen, but not very well in this view. Retaining notch 14 is used to attach items 20 to device 10, as described above, and as shown in FIGS. 5A and 5B. Retaining notch 14 is also shown in FIGS. 3A–3C. As mentioned above details of retaining notch 14 and how it functions with a mating T-shaped element fastened to an item 20 to attach the item to device 10 are not presented here.

FIGS. 3A–3C respectively show isometric views of the top, left side and rear of novel fastening device 10. FIG. 3A shows a top view of fastening device 10 showing the circular cross-section of vertical channel 11 having a diameter of d1, and cut back edges 12a and 12b. Points 18a and 18b respectively at the top of edges 12a and 12b are shown. Also shown is a top view of retaining notch 14 showing its T-shape for accepting a mating T-shaped element (not shown) fastened to the rear of an item 20. For proper operation of fastening device 10 the diameter of a circular cross-section pole 15 to which it is attached should also have a diameter of d1. Optional tapered edges 12a and 12b, and tapered vertical edges 13a and 13b, mentioned above in the description of FIG. 1 are not shown in this figure.

FIG. 3B shows a left side view of fastening device 10. The vertical dashed line between the top and bottom of device 10 shows the rear of vertical channel 11 with a point 17 at the top. Point 17 is shown in FIGS. 1 and 4B and is referenced with the description of the latter figure. The retaining notch 14 is also shown. Most importantly, cut back edges 12a and 12b and vertical edges 13a and 13b are shown. As shown in this figure cut back edges 12a and 12b are straight but they may also be curved outward to the left. Points 18a and 18b respectively define the top of cut back edges 12a and 12b, and points 19a and 19b respectively define the bottom of cut back edges 12a and 12b.

FIG. 3C shows a rear view of fastening device 10. This view best shows shape details of retaining notch 14. As described above a mating T-shaped element (not shown) fastened to an item 20 is slid into notch 14 to attach a device 20 to a device 10 attached to pole 15 as shown only in FIGS. 5A and 5B. Also shown is the piece of double sided tape 21 mounted inside vertical channel 11 in device 11 against its back wall as shown and described with reference to FIG. 1.

FIGS. 4A through 4C respectively show a left side view of novel fastening device 10 as it is being attached to a pole 15 in accordance with the teaching of the invention. Cut back edges 12a and 12b are important to quickly and easily attaching device 10 to pole 15. Also shown in these three figures is the optional piece of double sided tape 21 mounted inside vertical channel 11 in device 11 against its back wall as shown and described with reference to FIG. 1.

In FIG. 4A is shown the first step of attaching novel fastening device 10 to pole 15. The straight surfaces of cut back edges 12a and 12b are oriented slightly off parallel to the surface of pole 15 as shown. Points 18a and 18b are closer to pole 15 than points 19a and 19b. As described above with reference to FIG. 1, the distance between points 18a and 18b is greater than the distance between points 19a than 19b.

Fastening device 10 is then moved in the direction of arrow W into contact with pole 15 as shown in FIG. 4B. The distance between points 18a and 18b being d1 (shown in FIG. 3A), which is also the diameter of pole 15, the pole seats easily against the top rim of vertical channel 11 between points 18a and 18b and touches point 17 at the top, rear middle of channel 11 as shown in FIG. 4B. Thus, cut back edges 12a and 12b easily guide pole 15 into the top portion of vertical channel 11 in accordance with the teaching of the present invention. Stated another way, vertical channel 11 is thereby held and centered on pole 15 as it is snapped onto the pole. This facilitates the mounting of fastening device 10 to pole 15 without slipping off the side of pole 15 when force is applied to device 10 in the direction of arrow W to snap device 10 onto pole 15.

As fastening device 10 is being moved to the left in the direction of arrow W, pole 15 will first contact cut back edges 12a and 12b someplace between points 18a and 18b and points 19a and 19b but very near points 18a and 18b. This will occur because points 18a and 18b are closest to pole 15 and because the distance between these points is equal to d1, the diameter of pole 15. As device 10 is moved further to the left in the direction of arrow W pole 15 exerts a force against cut back edges 12a and 12b all along the point of contact between edges 12a and 12b and pole 15. These edges and the walls of channel 11 in the area of these edges are deformed outward and will continue to be deformed outward until they pass to the backside of pole 15 as the pole enters the interior of vertical channel 11. There is still force, but less force, is applied against the edges and channel walls as they pass to the backside of pole 15.

As device 10 continues to move to the left in the direction of arrow W other, lower portions of cut back edges 12*a* and 12*b* and portions of edges 13*a* and 13*b* and the walls of channel 11 in the area of these edges are deformed outward as a portion of pole 15 passes between them. The force exerted by pole 15 against the area of contact with edges 12*a* and 12*b*, edges 13*a* and 13*b* and the walls of channel 11 in the area of these edges increases as they are deformed outward until they pass to the backside of pole 15 as the pole enters the interior of vertical channel 11. The key to the invention is that not all of edges 12*a* and 12*b*, edges 13*a* and 13*b* and the walls of channel 11 in the area of these edges are in contact with pole 15 at the same time.

This distribution of force timewise on fastening device 10 during its installation makes it easier to attach device 10 to pole 15. If, alike the prior art, edges 13*a* and 13*b* were placed in uniform contact with pole 15 a large force would have to be applied at one time to deform all of edges 13*a* and 13*b* and the channel walls in the area of these edges to deform them at the same time to snap device 10 onto pole 15. Alternatively, to lower this large installation force in the prior art the front opening of the equivalent of channel 11 (width of 19*a*–19*b*) may be enlarged but this defeats the holding ability of the device.

When pole 15 contacts point 17 at the rear of vertical channel 11 of fastening device 10 as shown in FIG. 4B it's purely leftward motion is stopped. A downward force in the direction of arrow X is then applied which pivots device 10 about point 17 into closer contact with pole 15. With this clockwise motion of deice 10 the edges 12*a* and 12*b*, edges 13*a* and 13*b* and the walls of channel 11 in the area of these edges change and move toward the bottom of device 10 as described above.

As previously described, there is a piece of double sided tape 21 that can be placed inside vertical channel 11 in device 11 against its back wall as shown in FIGS. 4A–4C and 1. When fully seated and device is mounted fully onto pole 15 tape 21 bonds fastening device 10 to pole 15 so it cannot rotate or move along the pole and cannot be removed from the pole. If it is desired to have device 10 rotate or move along pole 15 or to be removed at a later time without extreme difficulty, tape 21 should not be used.

FIGS. 5A and 5B show the novel fastening device 10 attached to pole 15 in two different orientations with an electronic device 20 attached to device 10. In FIG. 5A fastening device 10 is attached to a generally vertical pole and a hand-held radio 20 is attached to device 10 using retaining notch 14 cooperating with a mating T-shaped element fastened to hand-held radio 20 as very briefly described above.

In FIG. 5B fastening device 10 is attached to an angled pole 15. As may be seen in this figure retaining notch 14 cooperates with a mating T-shaped element fastened to hand-held radio 20 so that radio 20 can hang generally vertically no matter what the orientation of pole 15.

While what is described herein is the preferred embodiment of the invention it will be understood by those skilled in the art that numerous changes may be made without departing from the spirit and scope of the invention. For example, the length of cut back edges 12*a* and 12*b* may be shorter or longer, and the width between edges 13*a* and 13*b* as compared to the diameter of channel 11 and pole 15 may be different. Also, the pole need not be round but may have an oval cross sectional area.

What is claimed is:

1. A device for fastening items to a pole, the fastening device comprising:
   a main body;
   a first, elongated arcuate member attached to the main body, the first arcuate member having lengthwise contiguous first and second edge portions furthest from the main body; and
   a second, elongated arcuate member attached to the main body, the second arcuate member having lengthwise contiguous third and fourth edge portions furthest from the main body;
   wherein the first, elongated arcuate member and the second, elongated arcuate member define an elongated open channel between them;
   wherein the first and second edge portions do not touch the third and fourth edge portions and the space between them leaves the channel open;
   wherein the first and third edge portions are generally parallel and the second and fourth edge portions diverge apart starting at a point where they are lengthwise contiguous with the first and third edge portions, and the spacing between the second and fourth edge portions is wider further away from the contiguous point; and
   wherein the first and second elongated arcuate members are resilient and can be readily spread apart to attach the device to the pole, wherein the second and fourth edge portions initially contact the pole and spread apart followed by the first and third edge portions contacting the pole and spreading apart as the device is attached to the pole, and the first through fourth edge portions then return to their original positions to hold the device to the pole.

2. The device for fastening items to a pole in accordance with claim 1 further comprising means for attaching items to the device after the device has been fastened to the pole.

3. The device for fastening items to a pole in accordance with claim 2 wherein when the device is being attached to the pole, the pole initially lies between the second and fourth edge portions where they are spaced the furthest apart, and the pole lies partially in the open channel so that it is retained in the channel and does not slip therefrom as the pole is fully entering the channel to be mounted on the pole.

4. The device for fastening items to a pole in accordance with claim 3 wherein as the device is being attached to the pole, the pole progressively passes between the second and fourth edge portions and the first and third edge portions in a timewise manner to minimize force necessary to attach the device to the pole.

5. The device for fastening items to a pole in accordance with claim 1 wherein as the device is being attached to the pole, the pole progressively passes between the second and fourth edge portions and the first and third edge portions in a timewise manner to minimize force necessary to attach the device to the pole.

6. The device for fastening items to a pole in accordance with claim 5 wherein when the device is being attached to the pole, the pole initially lies between the second and fourth edge portions where they are spaced the furthest apart, and the pole lies partially in the open channel so that it is retained in the channel and does not slip therefrom as the pole is fully entering the channel to be mounted on the pole.

7. The device for fastening items to a pole in accordance with claim 5 wherein the spacing between the second and fourth edge portions at the last mentioned point equals the width of the pole.

8. The device for fastening items to a pole in accordance with claim 1 wherein when the device is being attached to the pole, the pole initially lies between the second and fourth edge portions where they are spaced the furthest apart, and the pole lies partially in the open channel so that it is retained in the channel and does not slip therefrom as the pole is fully entering the channel to be mounted on the pole.

9. The device for fastening items to a pole in accordance with claim 8 wherein as the device is being attached to the pole, the pole progressively passes between the second and fourth edge portions and the first and third edge portions in a timewise manner to minimize force necessary to attach the device to the pole.

10. The device for fastening items to a pole in accordance with claim 8 wherein the spacing between the second and fourth edge portions at the last mentioned point equals the width of the pole.

11. A device for fastening items to a pole, the device comprising:
a body having a side with a recessed elongated channel within and along the length of the side of the body, the channel not being fully inside the body so that it defines an elongated opening having a first side and a second side on opposing sides of the elongated opening and along the length of the side of the body, and the elongated opening provides an entrance for the pole to enter the recessed channel, the first side of the opening is defined by a portion of the body defining first and second edge portions that are lengthwise contiguous to each other and the second side of the opening is defined by a portion of the body defining third and fourth edge portions that are lengthwise contiguous to each other;
wherein the first and third edge portions are generally parallel and the second and fourth edge portions diverge apart starting at the point where they are lengthwise contiguous with the first and third edge portions, and the spacing between the second and fourth edge portions is wider further away from the last mentioned point; and
wherein the first and second sides are resilient and can be readily spread apart to attach the device to the pole, wherein the second and fourth edge portions initially contact the pole and spread apart followed by the first and third edge portions contacting the pole and spreading apart as the device is attached to the pole, and the first through fourth edge portions then return to their original positions to hold the device to the pole.

12. The device for fastening items to a pole in accordance with claim 11 wherein as the device is being attached to the pole, the pole progressively passes between the second and fourth edge portions and the first and third edge portions in a timewise manner to minimize force necessary to attach the device to the pole.

13. The device for fastening items to a pole in accordance with claim 12 wherein when the device is being attached to the pole, the pole initially lies between the second and fourth edge portions where they are spaced the furthest apart, and the pole lies partially in the open channel so that it is retained in the channel and does not slip therefrom as the pole is fully entering the channel to be mounted on the pole.

14. The device for fastening items to a pole in accordance with claim 13 further comprising means for attaching items to the device after the device has been fastened to the pole.

15. The device for fastening items to a pole in accordance with claim 11 further comprising means for attaching items to the device after the device has been fastened to the pole.

16. The device for fastening items to a pole in accordance with claim 15 wherein when the device is being attached to the pole, the pole initially lies between the second and fourth edge portions where they are spaced the furthest apart, and the pole lies partially in the open channel so that it is retained in the channel and does not slip therefrom as the pole is fully entering the channel to be mounted on the pole.

* * * * *